United States Patent [19]

Urayama et al.

[11] Patent Number: 4,806,861
[45] Date of Patent: Feb. 21, 1989

[54] METHOD AND SYSTEM FOR DETECTING TAPE DEFECTS BY TRANSPORTING A TAPE IN TWO DIRECTIONS

[75] Inventors: Yuji Urayama; Kuniharu Kondo, both of Maebashi; Takeshi Nakatsukasa, Shibukawa, all of Japan

[73] Assignee: Victor Company of Japan, Limited, Kanagawa, Japan

[21] Appl. No.: 17,667

[22] Filed: Feb. 24, 1987

[30] Foreign Application Priority Data

Feb. 24, 1986 [JP] Japan .................................. 61-38925

[51] Int. Cl.[4] ...................... G01R 33/12; G11B 15/48; G03B 1/04; B65H 59/38
[52] U.S. Cl. .................................. 324/212; 324/226; 242/186; 360/74.2
[58] Field of Search ............... 324/210, 211, 212, 226; 360/74.2, 74.5, 137; 369/53, 58; 340/675, 676, 677; 242/186, 191

[56] References Cited

U.S. PATENT DOCUMENTS 4,553,182 11/1985 Narita .................................. 360/137

Primary Examiner—Reinhard J. Eisenzopf
Assistant Examiner—Walter E. Snow
Attorney, Agent, or Firm—Jordan and Hamburg

[57] ABSTRACT

A method and an apparatus for detecting a defect of a magnetic tape which is loaded in a dictating machine for recording and reproducing dictations. In the event of initialization, the tape is automatically transported in a fast forward mode for a predetermined period of time and, then, a counter is loaded with an initial value. Thereafter, the tape is rewound while, at the same time, the counter counts reel rotation detection pulses. The tape is decided to be defective when the count of the counter at beginning of tape does not lie in a predetermined range, and free from defects when the count lies in the predetermined range. In an operation mode after the initialization, presence/absence of the pulses is detected. If the pulses are present, the count of the counter is compared with a predetermined reference value and, when the count is greater or smaller than the reference value, the tape is decided to be defective while, when the pulses are absent, the tape is decided defective if the count is not close to the reference value. The pulses are derived from a particular reel which is to take up a tape in a playback mode.

6 Claims, 3 Drawing Sheets

METHOD AND SYSTEM FOR DETECTING TAPE DEFECTS BY TRANSPORTING A TAPE IN TWO DIRECTIONS

BACKGROUND OF THE INVENTION

The present invention relates to a method and an apparatus for detecting defects of a tape which is usable to record and reproduce dictations.

In countries in Europe and America in particular, a central dictation system is extensively used in which a dictating machine is installed in a certain location and operated by remote control from one or more terminal units. The system allows messages which are dictated on the terminal units to be sent to the dictating machine to be recorded on a magnetic tape, which is loaded in the machine. Specifically, a plurality of messages are sequentially recorded on the tape on a time division basis. Hence, when a tape recorded meassages is to be reused for other dictations or immediately after the power source of the machine has been turned on, the machine is routinely initialized to make it ready for dictation, i.e., erasing previously recorded and no longer needed the messages while rewinding the tape at a high speed. During the initialization, as soon as the tape is rewound to reach beginning of tape (BOT), the machine is automatically brought into a stop mode. Thereafter, a person in charge of the machine depresses a clear button and, then, manipulates a deck selection switch adapted to select, for example, one of two decks turning it to a dictation mode. This completes the initialization to thereby render the machine prepared for dictation.

Whether or not the high-speed erasure has been completed to BOT of a tape has customarily been determined by simply sensing pulses which are generated by detecting the rotation of a reel, which serves to take up or supply the tape at the time of initialization. Specifically, when the apparance of such pulses has ceased, it is determined that the erasure has been completed to BOT. However, such a prior art decision system brings about a critical problem when a tape is broken to cut or jammed before the rewind for initialization. So long as the pulses mentioned above are derived from the rotation of the reel which is to take up the tape in the high-speed rewind (REW) mode, such a problem may be detected by monitoring the pulses generated from the takeup reel which never stops, thus the pulses continue to be present more than a predetermined period of time. However, when the system is designed to sense rotation of the other reel, usually a takeup reel in a playback or a recording mode, which supplies the tape in the REW mode, the system functions as an automatic stop control in either situations, i.e., the completion of the initialization with a normal tape or torn tape which does not rotate the other reel. In other words, the system cannot distinguish an abnormal tape from a normal "end of the tape" stop. This prevents the operator of the machine from noticing the abnormal tape, and may attempt to make dictations which never materialize.

SUMMARY OF THE INVENTION

It is therefore an object of the present invention to provide a method and an apparatus capable of surely detecting defects of a magnetic tape which is adapted to record and reproduce dictations.

It is another object of the present invention to provide a generally improvement method and an apparatus for detecting defects of a magnetic tape which is adapted to record and reproduce dictations.

In accordance with the present invention, there is provided a method of detecting a defect of a magnetic tape which is loaded into a dictating machine for recording and reproducing dictations. The dictating machine is provided with a microcomputer to control operations of the machine, first and second reels which are respectively fastened to each end of the tape, and a rotation sensing device associated with the first reel sensing a rotation thereof for generating pulses, in response to the rotation with a normal tape loaded thereto the machine transporting the tape toward the first reel in a first mode and toward the second reel in a second mode. The method comprises the steps of: (a) in the event of initialization in which the tape is to be erased of dictations previously recorded thereon, putting the machine into the first mode for a predetermined period of time, (b) putting the machine into the second mode, (c) detecting presence of the pulses generated by the rotation sensing device, and (d) deciding that the tape is defective when the pulses are absent.

In accordance with the present invention, there is also provided a method of detecting a defect of a magnetic tape which is loaded into a dictating machine for recording and reproducing dictations. The dictating machine is provided with a microcomputer for controlling operations of the machine, first and second reels which are respectively fastened to each end of the tape, and a rotation sensing device associated with the first reel sensing a rotation thereof for generating pulses in response to the rotation. The rotation sensing device puts the machine into a stop mode cooperating with the microcomputer when the pulses are not generated, with a normal tape loaded thereto the machine transporting the tape toward the first reel in a first mode and toward the second reel in a second mode. The method comprises the steps of (a) in the event of initialization in which the tape is to be erased of dictations previously recorded thereon, putting the machine into the first mode for a predetermined period of time, (b) loading a counter with an initial value and, then, putting the machine into the second mode, (c) causing the counter to count the pulses so as to decrement the initial value, (d) detecting presence of the pulses generated by the rotation sensing device, and (e) when the pulses are absent, putting the machine into a stop mode and deciding that the tape is defective if a count of the counter is indicating more than a predetermined value.

In accordance with the present invention, there is also provided with an apparatus for detecting a defect of a magnetic tape which is loaded into a dictating machine having first and second reels which are respectively fastened to each end of the tape for recording and reproducing dictations. The apparatus comprises a microcomputer to control operations of the machine and a rotation sensing device associated with the first reel sensing a rotation thereof for generating pulses in response to the rotation, with a normal tape loaded thereto the machine transporting the tape toward the first reel in a first mode and toward the second reel in a second mode. The microcomputer puts the machine into the first mode for a predetermined period of time in the event of initialization in which the tape is to be erased of dictations previously recorded thereto, puts the machine into the second mode, detects presence of the pulses generated by the rotation sensing device, and decides that the tape is defective when the pulses are absent.

In accordance with the present invention, there is also provided with an apparataus for detecting a defect of a magnetic tape which is loaded into a dictating machine having first and second reels which are respectively fastened to each end of the tape for recording and reproducing dictations. The apparatus comprises a microcomputer having a counter for controlling operations of the machine, and a rotation sensing device associated with the first reel sensing a rotation thereof for generating pulses in response to the rotation. The rotation sensing device puts the machine into a stop mode cooperating with the microcomputer when the pulses are not generated, with a normal tape loaded thereto the machine transporting the tape toward the first reel in a first mode and toward the second reel in a second mode. The microcomputer puts the machine into the first mode for a predetermined period of time in the event of initialization in which the tape is to erased of dictations previously recorded thereon, loads the counter with an initial value and, then, puts the machine into the second mode, causes the counter to count the pulses so as to decrement the initial value, detects presence of the pulses generated by the rotation sensing device, and when the pulses are absent, puts the machine into a stop mode and decides that the tape is defective if a count of the counter is indicating more than a predetermined value.

The above and other objects, features and advantages of the present invention will become more apparent from the following detailed description taken with the accompanying drawings.

DESCRIPTION OF THE PREFERRED EMBODIMENT

Figure 1:
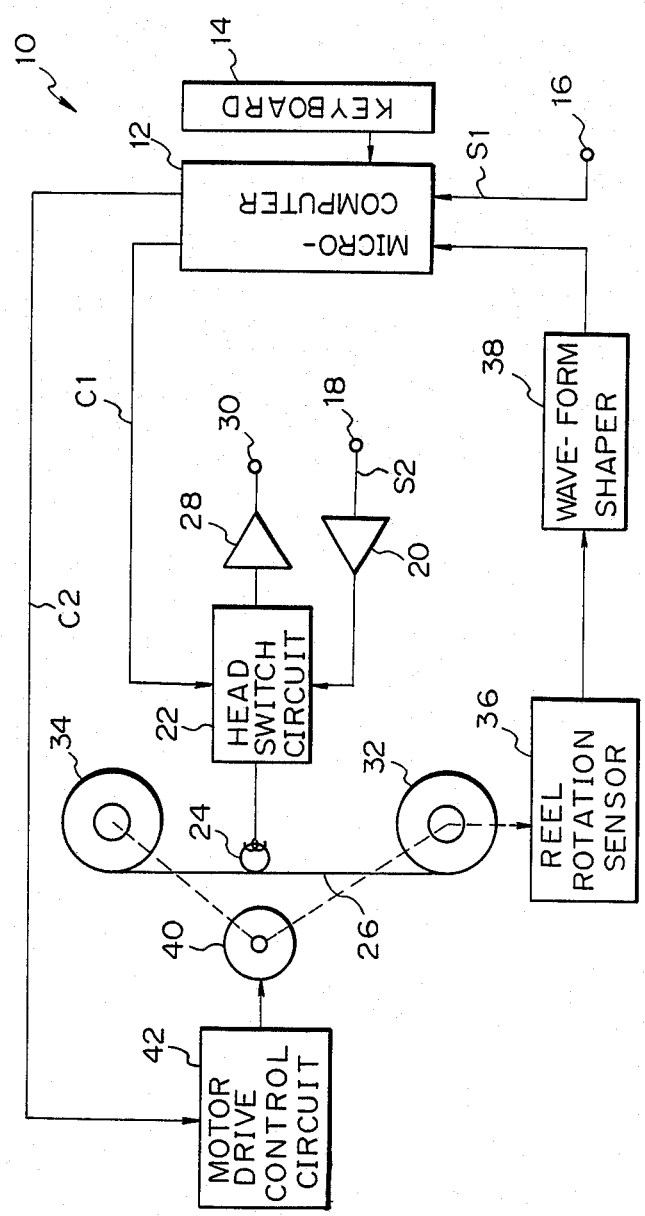
FIG. 1 is a block diagram showing an essential part of a dictating machine to which the present invention is applicable.

Referring to FIG. 1 of the drawings, an essential part of a dictating machine to which the present invention is applicable is shown. The operation in accordance with the present invention is demonstrated by the flowcharts of FIGS. 2 and 3 and is performed by a microcomputer, which will be described.

In FIG. 1, the dictating machine, generally 10, includes a microcomputer 12 which is provided with a keyboard 14. A mode control signal $S_1$ comes in through an input terminal 16 from a remote terminal or one or two or more remote terminals (not shown), which are located remote from the machine 10. Further, an audio signal $S_2$ which is representative of a message dictated by a person on the remote terminal arrives at an input terminal 18. In a central dictation system which accommodates a plurality of remote terminals, while any one of the terminals is using the machine 10, the others have their predetermined display sections turned on to show that the machine 10 is occupied. That is, it is impossible for two or more terminals to remote-control the single machine 10 to occupy it at the same time.

In a recording mode, a head switch circuit 22 is controlled by a switching signal $C_1$ from the microcomputer 12 such that an audio signal $S_2$ coming in through the input terminal 18 is fed to a magnetic head 24 via a record amplifier 20. This allows the audio signal, or message, to be recorded on a magnetic tape 26 which is being transported.

In a playback mode, on the other hand, the head switch 22 is actuated by the switching signal $C_1$ to deliver an audio signal reproduced from the tape 26 by the head 24 to a playback amp 28. The audio signal amplified by the amplifier 28 to a required level is applied to an output terminal 30.

A reel 32 is adapted to take up the tape 26 during usual playback or recording and, in this sense, it will be referred to as a take-up reel hereinafter while a reel 34 is adapted to supply the tape 26 and will be referred to as a supply reel 34. The rotation of the take-up reel 32 is sensed by a reel rotation sensor 36. The output of the sensor 36 is processed by a wave-form shaper 38 to become rotation detecting pulses which have sharp positive- and negative-going edges and are inversely proportional in period to the rotation speed of the take-up reel 32. The reels 32 and 34 are selectively driven by a reversible reel motor 40 which is in turn controlled by a reel motor drive control circuit 42. A forward-/reverse control signal $C_2$ is fed from the microcomputer 12 to the reel motor drive control circuit 42. The output torque of the motor 40 is transmitted selectively to the reels 32 and 34 by a mechanism which may include pulleys, belts, gears and others, as well known in the art.

A method of detecting defects of a tape in accordance with the present invention will be described in relation to the dictating machine 10.

Figure 2:
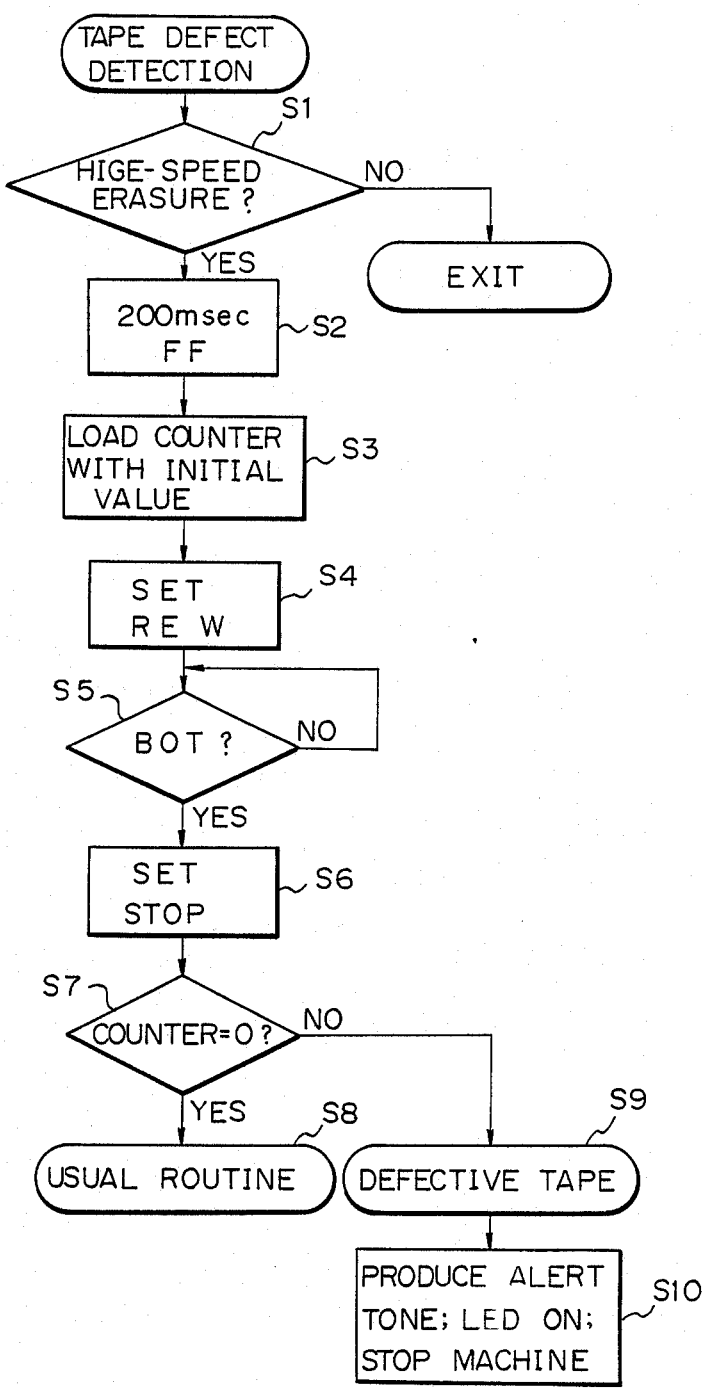
FIGS. 2 and 3 are flowcharts demonstrating the operation of one embodiment of the present invention.

First, a person to playback the tape 26 (generally called a supervisor) initializes the machine 10 causing the microcomputer 12 to perform a predetermined program as shown in FIG. 2. At the first step S1 of the program, the microcomputer 12 decides whether or not high-speed erasure is commanded. Because the initialization involves high-speed erase, the program advances to the next step S2 at which a fast forward (FF) signal is produced to cause the machine 10 to perform a FF operation for a predetermined period of time (200 milliseconds in this embodiments). By this operation, the tape 26 is transported from any position thereof in the same transport direction as in recording and playback and for 200 milliseconds at a high speed. It is to be noted that the period of time of FF operation is selected to be a limited value (200 milliseconds in this embodiment) during which the number of generated pulses is great enough for the microcomputer 12 to detect the presence/absence of the previously stated rotation detecting pulses and to detect a possible tape break by counting the pulses (e.g. several tens of pulses).

Thereafter, the microcomputer 12 initializes a counter which is built therein for counting the pulses (step S3 of FIG. 2). Specifically, the counter is loaded with an initial value which is a predetermined positive value smaller than the number of pulses which are to be counted during the above-mentioned FF period. In this condition, the microcomputer 12 sets up a REW mode (Step S4) so that the tape 26 is transported at a high-speed in the opposite direction to the recording and playback direction, the supply reel 34 taking up the tape 26. During this REW operation, the counter installed in the microcomputer 12 is decremented by the input pulses. When the tape 26 is fully taken up on the supply reel 34 or even when the supply reel 34 continues to rotate due to a break of the tape 26, the rotation of the take-up reel 32 is stopped resulting that the the pulse are not generated any longer. Hence, at the next step S5, the microcomputer 12 sees if the arrival of pulses has ceased and, if the result is YES, decides that the tape has been taken up to BOT. Then, the microcomputer 12 causes the machine 10 into a stop mode (step S6).

The counter is continuously decremented throughout the REW mode operation and is constructed to hold zero or a predetermined value after reaching it even when any pulse arrives subsequently. As previously stated, the initial value of the counter as loaded at the step S3 is a predetermined one which is smaller than the number of pulses which appear during the 200 millisecond FF intervals. Therefore, so long as the tape 26 is free from defects, the counter is necessarily decremented to zero. Then, the microcomputer 12 advances to a step S7 of FIG. 2 to determine whether or not the count of the counter is zero. If the count is zero, the program is transferred to an orindary routine (step S8) and, if it is not zero, the microcomputer 12 decides that the tape 26 is broken or otherwise damaged (step S9). When the tape 26 is defective, the microcomputer 12 alerts the supervisor to the defect by, for example, displaying it on a predetermined display section (LED) and/or producing an alert tone while, at the same time, interrupting the operation of the machine 10.

After the initialization and tape defect detection procedure explained above, the machine 10 is remote-controlled by any remote terminal for subsequent dictating operation. During the subsequent dictating operation, the defect of the tape 26 if any is also detected by the following procedure. In this instance, the tape 26 has already been initialized which means that the tape 26 is erased as fully rewound to the supply reel 34, and the counter is cleared to "zero", the count of pulses at BOT of the tape 26 which is zero or nearly zero has been stored in a predetermined storage inside of the microcomputer 12, and the count of pulses at the end of the tape 26 (EOT: end of tape) under a normal condition has been stored as a reference value according to the known tape length contained in a standard microcassette or like casing.

Figure 3:
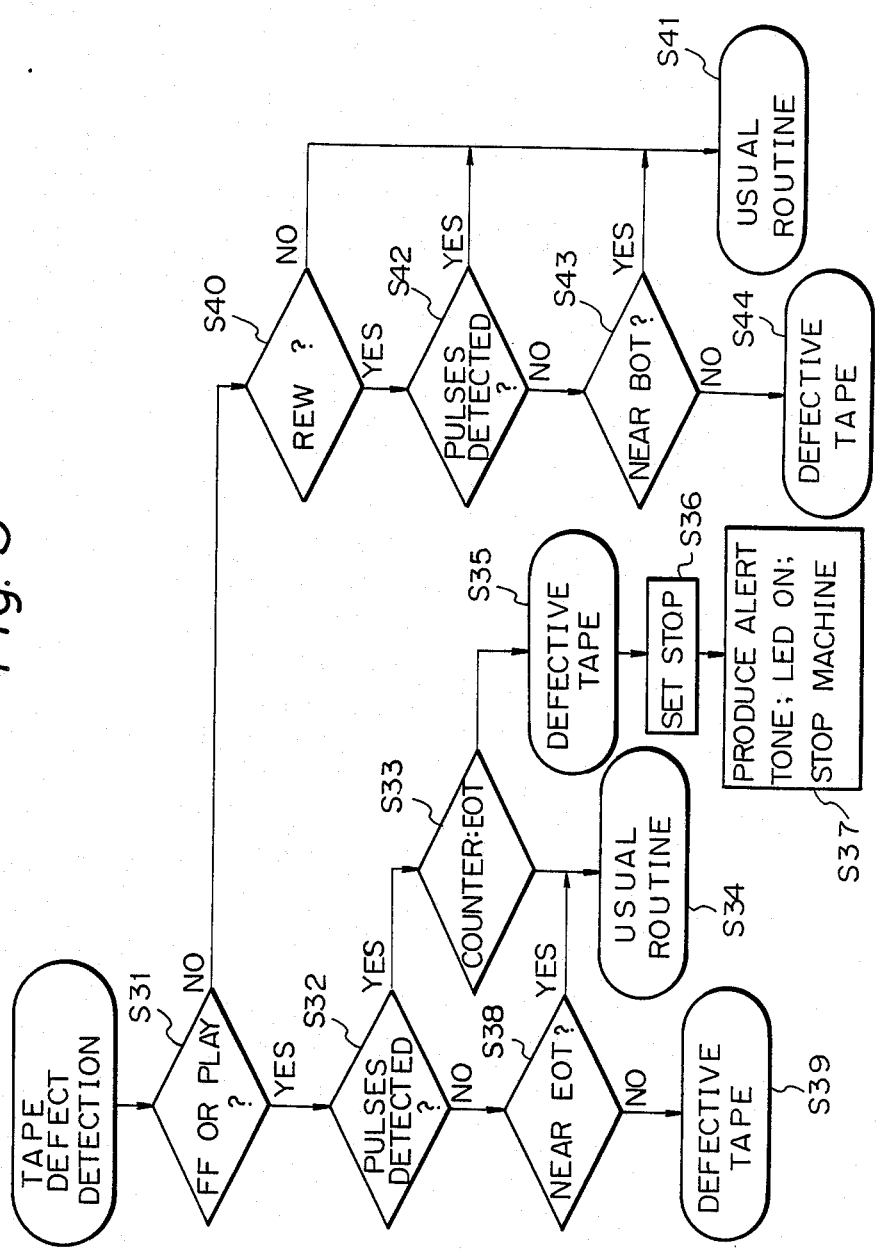

At the first step S31 of FIG. 3, the microcomputer 12 checks the machine 10 to see if it is in a FF mode or a playback (PLAY) mode and, if it is in any of the two modes, decides whether the previously stated rotation detecting pulses are present (step S32). If the pulses are present, they are counted up by a counter built in the microcomputer 12 while, at the same time, the microcomputer 12 compares each instantaneous count with the previously mentioned reference value which is associated with EOT (step S33). When the count is equal to or less than the reference value, the microcomputer 12 advances to a usual routine because the tape 26 is short of EOT or has just reached EOT (step S34). Conversely, a count greater than the reference value implies that, despite that the tape 26 has reached EOT, the rotation of the take-up reel 32 and, therefore, the generation of pulses is continuing. Then, the microcomputer 12 dicides that the tape 26 is defective (step S36) and brings the machine 10 into a stop mode (step S36). Again, in the stop mode, the microcomputer 12 informs the supervisor of the defect by, for example, energizing a display (LED) and/or producing an alert tone, while interrupting the operation of the machine 10 (step S37).

If the result of the step 32 is NO, the microcomputer 12 checks the counter to see if the count of that instant is close to the reference value as previously mentioned (step S38). If so, the absence of pulses is accounted for by the termination of the FF or the PLAY operation at EOT and, hence, the microcomputer 12 advances to the usual routine determining that the tape 26 is defect-free (step S34). However, if the microcomputer 12 has found that the count of the counter is not close the reference value, it determines that the take-up reel 32 has accidentally failed to rotate due to, for example, jammed tape and, therefore, no pulse has been generated, consequently deciding that the tape 26 is defective (step S39).

If the machine 10 is neither in the FF mode nor in the PLAY mode, the microcomputer 12 decides wheter it is in a REW mode (step S40 of FIG. 3) and, if not, returns to the usual routine terminating the defect detecting procedure (step S41). IF the machine 10 is in a REW mode, the microcomputer 12 determines the presence/absence of the pulses (step S42 of FIG. 3) and, if absent, checks the counter to see if its count of that instant is equal to or close to the reference value associated with BOT (e.g. zero) (step S43). If the former is not even close to the latter, the microcomputer 12 decides that the transport of the tape 26 has been disturbed by jammed tape, thus interrupting the generation of pulses and, therefore, that the tape 26 is defective (step S44 of FIG. 3).

When detected pulses at the step S42, the microcomputer 12 decrements the counter thereof in response to the pulses while deciding that the tape 26 is being normally rewound. Also, when determined that the count at the instant when the arrival of the pulses has ceased is closed to BOT at the step S43, the microcomputer 12 decides that the tape 26 has been fully taken up to BOT. In any case, the microcomputer 12 proceeds to the usual routning deciding that the tape 26 is defect-free (step S41).

In summary, it will be seen that in accordance with the present invention a magnetic tape with a break and other defects is surely detected during initialization of a dictating machine because both of a REW mode and a FF mode are effected in the event of initialization. In addition, defective tapes resulted from various occurrences other than breakage and the like are detected during operation of the machine which follows the initialization.

Various modifications will become possible for those skilled in the art after receiving the teachings of the present disclosure without departing from the scope thereof. For example, the pulses repeatedly mentioned above may be derived from the supply reel 34 instead of the take-up reel 32 or from both of them.

What is claimed is:

1. A tape defect detecting system for detecting a defect in a magnetic tape comprising:
    a dictating machine into which a magnetic tape is loaded and having first and second reels which are respectively fastened to each end of said tape for recording and reproducing dictation;
    a microcomputer having a counter for controlling operation of said machine; and
    rotation sensing means associated with said first reel for sensing the rotation thereof and operable to generate pulses in response to said rotation, said rotation sensing means being cooperable with said microcomputer to put said machine into a stop mode when said pulses are not generated and, when a normal tape is loaded into said machine, to transport said tape toward said first reel in a first mode and toward said second reel in a second mode;

said microcomputer being operable to put said machine into said first mode for a predetermined period of time in the event of initialization in which said tape is to be erased of dictation previously recorded thereon, to load said counter with an initial value, and then, to put said machine into said second mode and cause said counter to count said pulses so as to decrement said initial value, said microcomputer further being operable to detect the presence of said pulses generated by said rotation sensing means, and when said pulses are absent, to put said machine into a stop mode and determine that said tape is defective when the count of said counter indicates more than a predetermined value.

2. A method of detecting a defect of a magnetic tape which is loaded into a dictating machine for recording and reproducing dictations, said dictating machine being provided with a microcomputer for controlling operations of said machine, first and second reels which are respectively fastened to each end of said tape, and rotation sensing means associated with said first reel sensing a rotation thereof for generating pulses in response to said rotation, said rotation sensing means putting said machine into a stop mode cooperating with said microcomputer when said pulses are not generated, with a normal tape loaded thereto the machine transporting said tape toward said first reel in a first mode and toward said second reel in a second mode, said method comprising the steps of:
(a) in the event of initialization in which said tape is to be erased of dictations previously recorded thereon, putting said machine into said first mode for a predetermined period of time;
(b) loading a counter with an inital value and, then, putting said machine into said second mode;
(c) causing said counter to count said pulses so as to decrement said initial value;
(d) detecting presence of said pulses generated by said rotation sensing means and;
(e) when said pulses are absent, putting the machine into a stop mode and deciding that said tape is defective if a count of said counter is indicating more than a predetermined value.

3. A method as claimed in claim 2, wherein said predetermined period of time is 200 milliseconds.

4. A method as claimed in claim 2, further comprising, after step (e), the steps of:
(f) clearing said counter and putting said machine into said first mode, and causing said counter to start counting said pulses, and detecting presence of said pulses;
(g) when said pulses are absent, comparing a count of said counter with a reference value which corresponds to an end of tape transportation in said first mode; and
(h) when said count is greater than said reference value, deciding that said tape is defective.

5. A method as claimed in claim 2, further comprising, after steps (e), the steps of:
(f) clearing said counter and putting said machine into said first mode, and causing said counter to start counting said pulses, and detecting presence of said pulses;
(g) when said pulses are absent, comparing a count of said counter with a reference value which corresponds to an end of tape transportation in said first mode; and
(h) when said count is not in a proximity of said reference value, deciding that said tape is defective.

6. A method as claimed in claim 2, further comprising, after step (e), the steps of:
(f) clearing said counter and putting said machine into said second mode, and causing said counter to start counting said pulses, and detecting presence of said pulses;
(g) when said pulses are absent, comparing a count of said counter with a reference value which corresponds to an end of tape transportation in said second mode; and
(h) when said count is not in a proximity of said reference value, deciding that said tape is defective.

* * * * *